Dec. 1, 1959  T. R. SMITH  2,915,158
CONTROL MEANS FOR SPRING CLUTCH DRIVES
Filed March 12, 1954  4 Sheets-Sheet 1

Inventor
Thomas R. Smith

Dec. 1, 1959  T. R. SMITH  2,915,158
CONTROL MEANS FOR SPRING CLUTCH DRIVES
Filed March 12, 1954  4 Sheets-Sheet 2
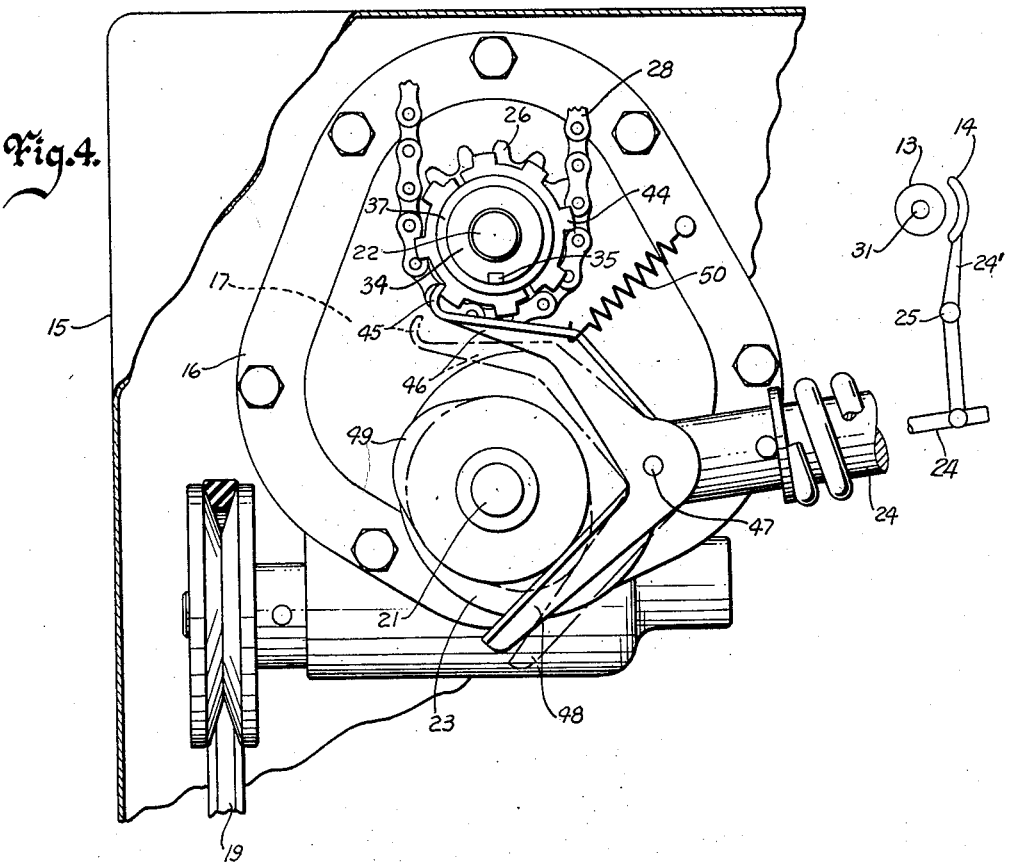
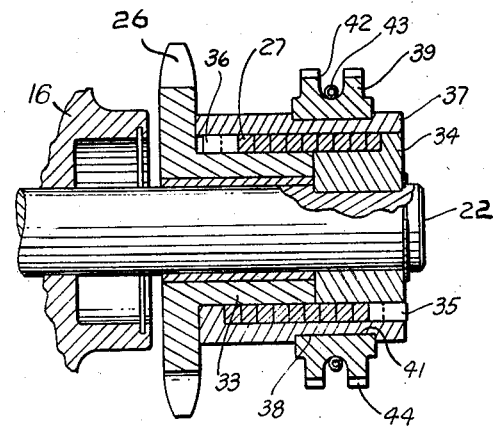
Inventor
Thomas R. Smith
By Wilkinson Huxley Byron & Hume
Attys Inventor
Thomas R. Smith Dec. 1, 1959   T. R. SMITH   2,915,158
CONTROL MEANS FOR SPRING CLUTCH DRIVES
Filed March 12, 1954   4 Sheets-Sheet 4
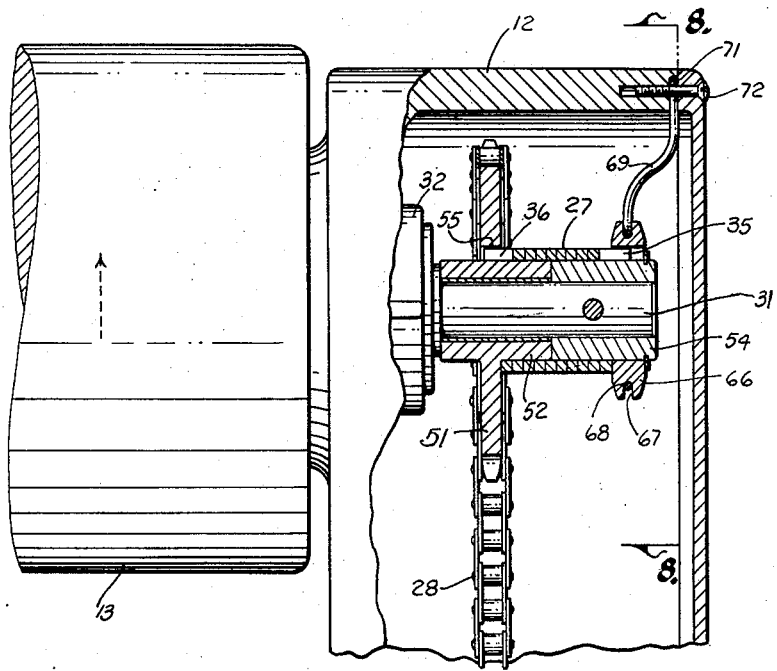
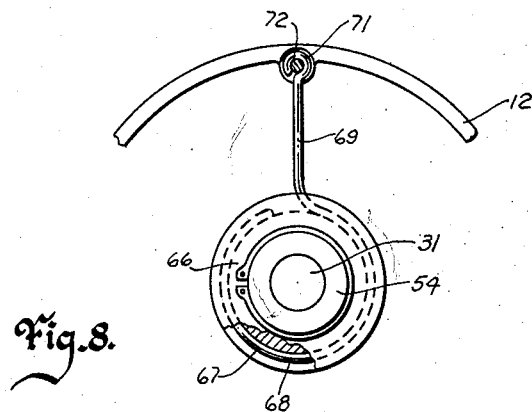
Inventor
Thomas R. Smith
By Wilkinson, Huxley, Byron & Hume
Attys.

United States Patent Office 2,915,158
Patented Dec. 1, 1959

2,915,158

CONTROL MEANS FOR SPRING CLUTCH DRIVES

Thomas R. Smith, Newton, Iowa, assignor to The Maytag Company, Newton, Iowa, a corporation of Delaware Application March 12, 1954, Serial No. 415,793

13 Claims. (Cl. 192—81)

This invention relates to clutches and more particularly to control means for spring type clutches for transmitting rotary movement from a driving member to a driven member.

It is one of the objects of the invention to provide a coil spring type clutch with a frictional control means which is effective to provide for automatic engagement and release of the spring clutch.

As a specific example of use without limitation, in the operation of roll type ironing machines, there are times when the operator places material in position to be pressed when it is desirable to turn the roll or mangle freely. Also, after pressing, there is less danger of wrinkling the material or fabric if it is withdrawn over a freely revolving roll, rather than one which will not revolve and over which it must be slid.

In accordance with the invention, a coil spring clutch mechanism is interposed between driven and driving members. One end of the clutch spring is secured to the driving member with its connected coils loosely wrapped with respect to the driven member. Carried upon the driven member and connected to the free end of the spring is a collar having a relatively revoluble friction element which may be selectively rotated with the collar or restrained against rotary movement. When the friction element is restrained against rotary movement, the rotating collar is temporarily halted, and such action permits the spring to contract from the driving end in such direction as to engage and grip the driven member to rotate the same in unison with the driving member. Since the collar and free end of the spring are secured together, the collar will likewise rotate at the same speed as the spring. However, during the interval when the friction member is restrained from rotary movement, relative rotary motion takes place between the collar and friction member, and this relative rotary movement provides a constant biasing force on the free end of the spring to maintain it in contracted condition in driving relation to the driven parts. When the friction element is released, it begins to rotate with the collar and no longer applies loading in the proper direction to maintain the spring in its contracted driving position. Thus the free end of the spring moves relative to the driven member to release the grip of the spring. At such time the driven member is completely disconnected from the driving mechanism, and may be readily turned manually in either direction.

In still another form, the friction member is anchored to the housing or casing and whenever the driving member is rotated, the friction member supplies the proper restraint on the collar to cause the spring to engage the driven member. However, when rotation of the driving member is terminated, the clutch connection is still maintained until such time as the driven member is manually overdriven to release the bias on the clutch spring, which then automatically relaxes to break the driving connection, after which the driven member may be freely rotated in either direction.

Accordingly, it is another object of the invention to provide a coil spring clutch, having a driving end and a driven end, with a frictional control means which is effective momentarily to restrain the rotation of the driven end to cause the spring to engage and drive the driven member.

It is yet another object of the invention to provide driving and driven members with a coil spring clutch having an end anchored to the driving member and its other end associated with a collar carried by the driven member, which collar is momentarily restrained against rotary movement to cause the coil spring to move in such direction as to engage and drive the driven member, after which the collar turns with the coil spring.

It is still another object of the invention to provide driving and driven members having a coil spring therebetween with an end of the spring secured to the driving member and its free end controlled by a friction member to control the application of the clutch when relative motion takes place between the clutch and friction member, to release the drive when either no or opposite relative motion takes place therebetween.

Other objects, features, capabilities and advantages are comprehended by the invention, as will later appear and as are inherently possessed thereby.

Referring to the drawings:

Figure 3 is a further enlarged longitudinal detail sectional view of the clutch shown in Figure 2;

Figure 4 is an end elevational view of the clutch and power housing taken in the plane 4—4 of Figure 2;

Figure 7 is a longitudinal partial sectional view of a still further modified construction for a clutch element; and Figure 8 is a detail vertical partial sectional view of the control taken on the line 8—8 of Figure 7.

Figure 1:
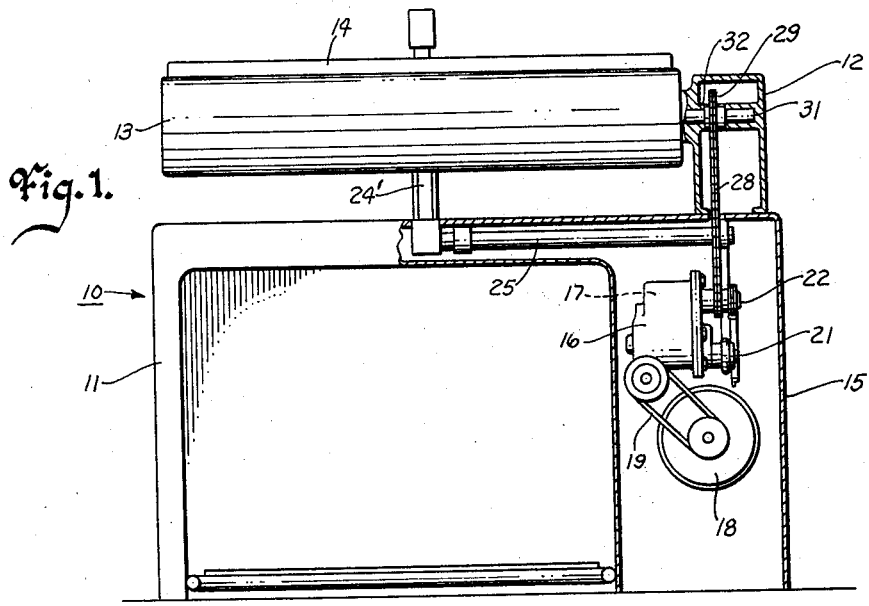
Figure 1 is a diagrammatic longitudinal partial sectional view of a roll type ironer with the improved clutch control applied thereto.

Referring now to the drawings for an illustrative example of the improved spring clutch control, there is shown in Figure 1 a domestic type ironing machine 10, which comprises the usual base or frame supporting construction 11, a head 12 mounted on the frame for supporting a roll or mangle 13 and a shoe 14 which is selectively movable into and out of engagement with the roll under the control of the operator in any suitable manner.

The supporting frame 11 includes a box structure 15 at one side thereof for carrying a gear housing 16 enclosing suitable gear reduction and speed change mechanism 17, the details of which are not shown, and a drive motor 18 connected thereto by means of a belt 19 for operating the same. Extending outwardly from one side of the gear housing is a pair of power output driving or operating shafts 21 and 22, respectively, both of which are rotated in one direction by the motor 18 through the gear reduction unit. The shaft 21 carries a shoe eccentric 23 for operating a shoe arm 24 which is connected to the end of a crank arm 24' through a torque tube 25 for moving the shoe 14 into and out of engagement with the roll 13. The means for operating the shaft 21 includes control means (not shown) for normally stopping the eccentric 23 at each half revolution, corresponding to the open and closed or press positions for the shoe 14.

Figure 2:
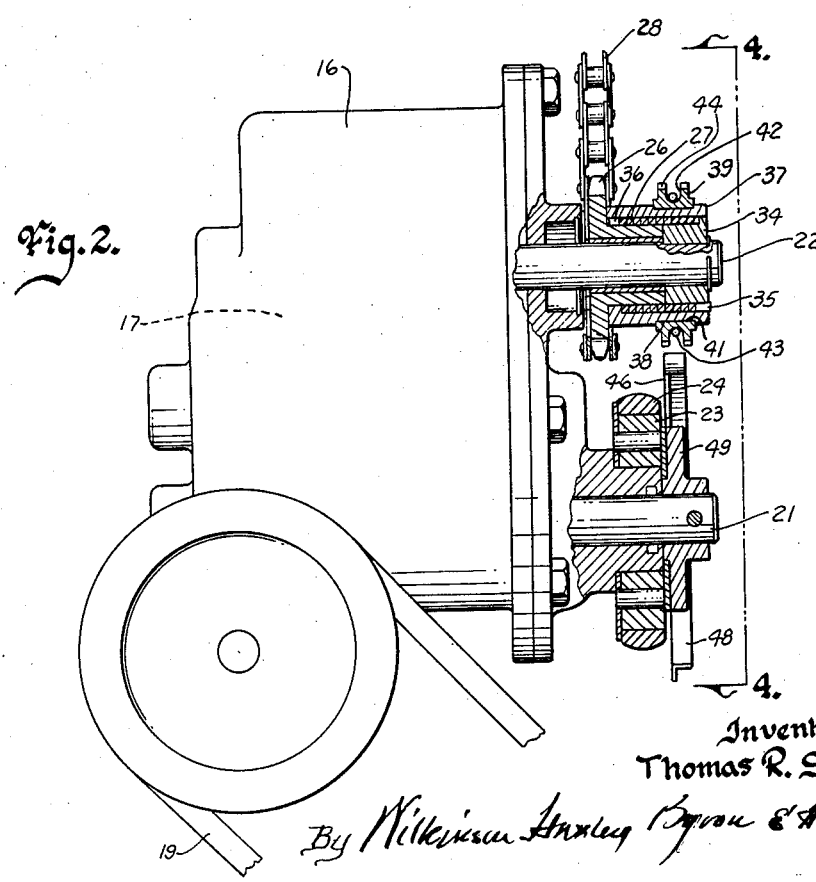
Figure 2 is a longitudinal enlarged detail partial sectional view of the drive mechanism for the ironer including the improved clutch.

The other driving shaft or member 22 is adapted to be continuously rotated at various selected speeds through the speed reduction mechanism 17. As seen in Figure 2, this shaft is connected to a sprocket member 26 driven by means of a coil spring type clutch 27 having the improved roll control means (described hereinafter) associated therewith. A chain 28 meshing with the sprocket 26 also meshes with a driven sprocket 29 which is rigidly secured to the roll shaft 31 (Fig. 1). The roll shaft has the ironing roll or mangle 13 secured thereto and is journaled in suitable bearings 32 carried in the head 12 to support the roll in its horizontal position. In this arrangement, when the sprocket 26 is revolved by the driving shaft 22 the ironing roll 13 is positively revolved because of the direct connection with the driven sprocket 29.

Heretofore, in apparatus of the type described, the ironing roll has been directly connected to the gear mechanism. Thus, when the shoe is released, the roll is automatically stopped and it is not possible freely to rotate the roll to position the material being ironed. This is objectionable because if the material to be ironed is placed on the roll where it is readily visible for arrangement, it is not in pressing position. Since the shoe must be closed or pressed against the roll before its rotation can be initiated, the material thus placed, in passing under the shoe, has a tendency to wrinkle or curl up in a roll at the leading edge against the forward end of the shoe. To avoid this, another alternative would be to place the material in position adjacent or beneath the shoe to start with. This has several disadvantages: One is that the arranging of the material on the roll must be done in an awkward manner away from the normal vision of the operator; and another is that the operator's hands must move relatively close to the heated shoe with the resultant danger of burns to the hands or fingers. A third objection is that once the material has passed under the shoe surface and the shoe is retracted, the ironed material is usually withdrawn over the stationary roll and its natural friction is such as to cause the ironed material to wrinkle or pull out of shape before it has the opportunity to dry properly.

The improved clutch mechanism overcomes the above objections, and, at the same time, provides a relatively simple means whereby the operator may position or arrange the material on the ironer roll in full view at the safe distance from the heated shoe, and then readily revolve the roll to position the material beneath the heated shoe surface, so that the shoe is pressed into engagement with the properly arranged material before the rotation of the roll is initiated. In addition, after the material has passed beneath the shoe, and the shoe is retracted from the roll, the material may be readily withdrawn, without wrinkling, by pulling the same over the freely revoluble ironer roll, which, under these conditions, will readily revolve in either direction.

In order to accomplish the above desired results, the coil spring clutch element 27 (Figs. 2 and 3) is disposed between the sprocket member 26 and the driving shaft 22. As more clearly appears in Figure 3, the sprocket 26, including an integral cylindrical hub portion 33, is freely journaled on a bearing surface concentric with and surrounding the driving shaft 22. The outer end of the driving shaft 22 carries a slotted cylindrical boss 34 rigidly secured thereon in any suitable manner which is disposed in axial alignment with respect to the hub 33 on the sprocket member 26, and one end thereof provides a thrust surface for the sprocket member. Encompassing the outer periphery of both the boss 34 and the hub 33 is the coil spring clutch element 27, which has an outwardly projecting tab 35 at one end disposed in a slot in the boss 34 and another outwardly projecting tab 36 on its other end, adjacent the sprocket, fitting within a slot carried in a cylindrical ring or collar 37 which in turn encompasses or surrounds the outer periphery of the coil spring. In this construction, the normal unbiased or relaxed position of the coil spring 27 is such as to be free of contact with the integral hub 33 on the sprocket. Thus, as the drive shaft 22 is rotated by the motor, the rotating boss 34 thereon rotates the coil spring through the tab 35 and the coil spring will rotate the collar 37 through the tab 36. However, the spring will be free from direct contact with the hub 33 on the sprocket.

The outer peripheral surface of the collar 37 is recessed to provide an annular shouldered groove 38 in which is mounted a split friction ring 39 having an inner peripheral surface 41 contacting the cylindrical surface of the groove. The split friction ring is preferably relieved to provide an outwardly projecting annular groove 42 in which is carried a garter spring 43 for applying a constant radially inwardly directed loading on the two contacting surfaces 38 and 41, and under no load transmitting conditions the friction ring 39 rotates with the collar 37. If the collar and friction element are formed from nylon or the like, it has been found a substantially constant co-efficient of friction may be provided therebetween under practically all operating conditions.

Projecting radially outwardly from the friction element 39 are a plurality of integral lugs 44, which are adapted to be engaged by an out-turned end 45 of a generally V-shaped rocker arm 46. This rocker arm pivots about a pin 47 and has its other outwardly directed arm 48 disposed adjacent an eccentric 49 carried on the eccentric shaft 21. The rocker arm is normally biased into engagement with the eccentric by means of a spring 50 so that the rocker arm will continuously ride thereon.

The rocker arm eccentric 49 is mounted with respect to the shoe eccentric 23 so that when the latter is at its maximum outward throw corresponding to the position where the shoe 14 is against the ironing roll 13, the rocker arm eccentric 49 is in such position as to permit movement of the free end 45 of the rocker arm 46 into the path of movement of the rotating lugs 44 on the friction ring 39.

Assuming the motor 18 is energized, the driving shaft 22 is rotating and the shoe 14 is retracted. Under these conditions the rocker arm 46 is held in its outer or open position by the crest of the eccentric 49 and the friction element 39 is free to rotate in unison with the collar 37. As the shoe eccentric 23 is rotated by the eccentric shaft 21 to move the shoe against the ironing roll, the rocker arm eccentric 49 is likewise rotated in such direction as to permit the spring 50 to move the hooked end 45 of the rocker arm into the path of the rotating outwardly projecting lugs 44 on the friction element. When the eccentric shaft 21 is rotated a half revolution, the clutch mechanism (not shown) is operated to stop the shaft.

As the end 45 of the rocker arm engages one of the lugs 44, rotation of the friction ring 39 is terminated and such action momentarily stops or slows down the rotating collar 37 to which the free end of the coil spring 27 is attached. This stopping or slowing down of the collar causes relative rotation between the ends of the coil spring, which results, in this construction, in the contraction of the coil spring beginning at the driving end upon boss 34 and the cylindrical hub 33 of the sprocket 26 to lock the two members together and drive the sprocket in unison with the driving shaft. Since the ironing roll 13 is directly connected to the sprocket 26 through the driven sprocket 29 and chain 28, it is obvious the ironing roll will be positively rotated thereby.

As mentioned previously, as the coil spring grips the hub 33 on the sprocket, the collar 37 through its connection with the free end of the spring is again rotated in unison with the driving shaft and other elements. However, since the friction element 39 is restrained by the rocker arm, relative rotary movement takes place between it and the rotating collar 37, as the surfaces 38 and 41 slide relative to each other. The total sliding frictional force between the two members will depend upon the materials used at the sliding surfaces and the pressure applied thereto by the garter spring 43. Such relative sliding movement between split function ring 39 and collar 37 will continuously provide a loading or contacting force on the free end 36 of the clutch spring to maintain it in engagement with the hub 33 to provide the positive driving connection.

At the end of the ironing operation, the operator actuates the shoe control mechanism and such action reengages the shoe operating clutch (not shown) to move the shoe and rocker arm eccentrics 23 and 49, respectively, to the other end of their travel which moves the shoe 14 away from the roll 13 to its retracted position. As the shoe begins to retract, the rocker arm eccentric 49 engaging the leg 48 of the rocker arm 46 rotates the same in such direction as to move the hooked end 45 away from the engaged lug 44 on friction element 39. When this occurs, the friction element 39 is released and immediately begins to rotate with the collar 37. This action releases the bias on the free end 36 of the clutch spring 27, whereupon the spring unwinds slightly and relinquishes its frictional grip on the sprocket hub 33. Thereafter, the friction element 39, collar 37, and clutch spring 27, rotate in unison with the driving shaft 22. As soon as the clutch spring is released, the ironer roll 13 is no longer connected to the driving shaft 22. Thus the ironer roll may be freely rotated by the operator in either direction of rotation with a minimum of effort and without restraint from the driving mechanism.

In this manner the operator may readily arrange the materials to be ironed on the roll in a convenient and comfortable position and then rotate the roll until the material which is to be pressed is under the heated shoe before the shoe is moved into pressing relation with the roll. Also, after being pressed, the material may be readily withdrawn over the freely rotatable roll in the opposite direction without the danger of wrinkling or stretching the same while still in a slightly damp condition.

Figure 5:
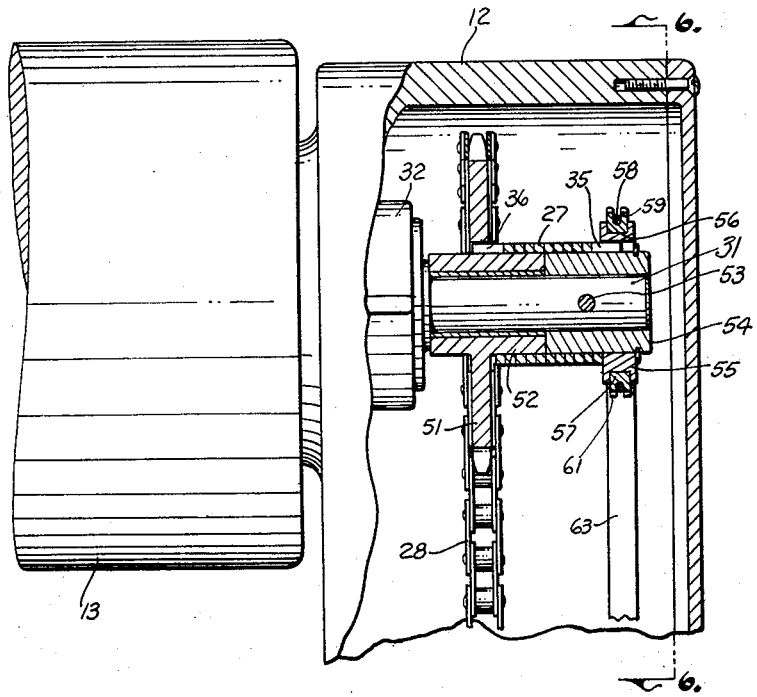
Figure 5 is a longitudinal partial sectional view showing a modified arrangement for a clutch control.
Figure 6:
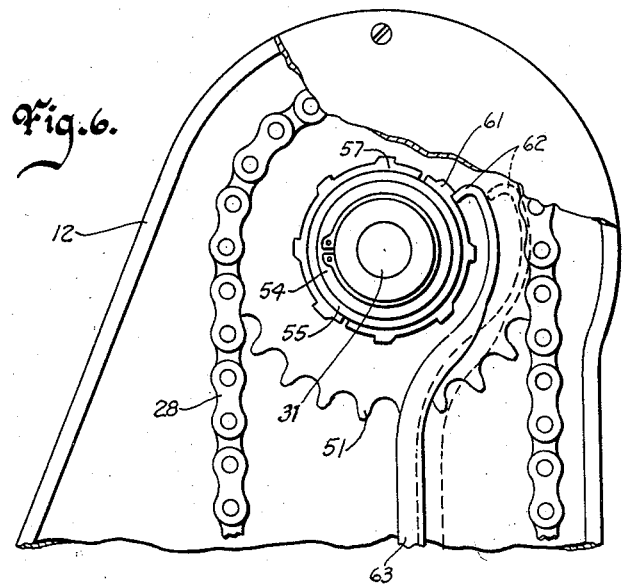
Figure 6 is a transverse vertical partial sectional view taken along the line 6—6 of Figure 5.

Referring now to Figures 5 and 6, there is shown a somewhat similar clutch control arrangement applied in this modification to the driven roll shaft 31, instead of upon the driving shaft 22 as previously described. In this construction the driving shaft has a driving sprocket wheel (not shown) positively secured thereto, and this sprocket is directly connected to a driven sprocket wheel 51 by means of the chain 28. The driven sprocket 51 is provided with a reduced cylindrical hub portion 52 loosely journaled on the roll shaft 31, which in turn carries a cylindrical boss 54 secured to said roll shaft by a pin 53 in juxtaposed relation to the hub 52. Both the boss 54 and hub 52 are substantially equal in diameter and are embraced by the coil spring clutch 27. The tab 36 on the one end of the clutch spring is disposed in a slot in the sprocket, and the tab 35 on the opposite end fits in a slotted portion provided in a rotatable annular collar 55. This collar is loosely mounted on the boss for slight relative rotation and rotates with the clutch spring when the sprocket 51 is rotated. The rotatable collar is grooved to provide a shouldered annular recess 56 for receiving a split friction element or ring 57 whose inner periphery is pressed radially inwardly against the cylindrical bottom of the groove by means of a garter spring 58 carried in an annular outwardly opening groove 59. This friction element includes integral and outwardly projecting lugs 61 which are adapted to be engaged by the projecting free end 62 of a rocker type lever 63 which is moved into and out of the path of the lugs 61 on the rotating friction element 57 by the cam means previously described during selected intervals in the ironing operation (also previously described). As in the arrangement described in connection with Figures 1–4, relative rotary sliding movement takes place between the collar and friction element when the end of the lever engages one of the lugs and terminates the rotation of the friction element.

In operation, the ironing roll 13 is rotated in the same manner as previously described, except that the spring type clutch is mounted on the roll shaft 31, rather than the driving shaft. When energized in the non-press position, the motor continuously rotates both sprockets along with the spring clutch 27, collar 55, and friction element 57. When the shoe control is actuated, the shoe moves inwardly and presses against the roll, and the lever 63 in the same operation is actuated so that its free end 62 moves into the path of the rotating lugs 61. Such action, as previously described, stops the friction element 57 against rotation and at the same time momentarily retards the collar 55 and free end of the clutch spring, to cause the continuously rotated clutch spring to contract and lock the sprocket 51 and roll shaft 31 together across the hub and boss positively to rotate the ironer roll 13. As soon as the gripping action is at the maximum, the collar 55 is again rotated at the same rate as the sprocket and shaft, and the frictional drag provided by the friction element 57 is sufficient continuously to bias the clutch spring in contracted relation so as to maintain the positive driving relation.

Upon release of the shoe, the lever 63 moves away from the engaged lug 61 on the friction element 57, which, in turn, immediately begins to revolve with the collar. This removes the bias on the end 35 of the clutch spring, and permits the clutch spring to unwind and automatically disconnect the roll shaft 31 from the driving member or sprocket 51, so that the ironer roll 13 may be freely turned in either direction, as previously described.

Figures 7 and 8 disclose a drive construction similar to that shown in Figures 5 and 6, but in this instance the rotatable collar 66 is provided with an annular peripheral groove 67 to receive and hold against axial movement a looped spring brake or drag element 68 which frictionally embraces and grips the rotatable collar 66 at all times. Projecting integrally from one side of the looped portion of the brake element is a generally radially projecting arm 69 having its outer end 71 anchored to the casing 12 by means of a screw or bolt 72. Thus, under all conditions of operation, the brake element 68 is anchored against rotation by means of the arm 69.

In this modification, assuming the roll shaft 31 is free, as soon as the motor is energized, the driven sprocket 51 is rotated in a manner as previously described. As the sprocket 51 and the spring 27 begin to rotate, the brake element 68 retards the normal rotation of the collar 66 and the free end 35 of the clutch spring 27. This retardation causes the spring to contract against the boss carried by the roll shaft 31 and against the sprocket hub 52 so as directly to connect the roll shaft 31 to the sprocket 51, thus positively to drive the roll. After the direct drive is effected, the collar 66 is revolved in unison with the boss 54 and the other moving parts. Due to the fact that the brake element is stationary, it will, after the mechanism is initially rotated, provide a constant bias on the collar 66 to maintain the clutch spring against the boss 54 and hub 52 on the roll shaft, thereby continuously to maintain the roll locked to the drive mechanism. This condition will prevail so long as the motor is energized, regardless of whether the shoe is in its pressing or retracted position.

At the end of the pressing operation, with the shoe retracted and with the roll 13 locked to the drive mechanism, if the roll 13 is grasped by the operator and rotated slightly in the direction of the arrow, a relative shift between the collar 66 and the brake element 68 is effected, which releases the bias acting on the free end 35 of the clutch spring, whereupon the latter automatically unwinds and relaxes slightly to break the positive connection between the driving and driven members. After this occurs, the roll 13 may then be freely turned to any desired position in either direction without interference or restraint from the driving mechanism.

In this modification, the roll 13 is revolved upon energization of the motor and is not dependent upon the closing action of the shoe. While in this modification free rotation of the ironer roll 13 is not automatic at the end of the pressing operation, still, the same general features of free rotation are realized by a relatively simple manual operation. A construction of this type has value in apparatus where low cost is important, and where, at the same time, it is desired to provide a simple and reliable spring clutch control.

While the spring clutch control has been primarily described as being applicable to an ironer construction, it is to be understood that a clutch control of this type could have other applications and that the general description is given by way of example, without limitation, merely for purposes of describing the improved control features. Also, it will be evident that the clutch spring may be of either the contracting or expanding types, depending upon the requirements of the design.

From the foregoing, it can be seen that a relatively simple control for a spring clutch construction has been provided which permits free rotation of a roll or driven shaft in either direction under no load conditions, which is simple in design and reliable in operation and at the same time permits the operator to rotate the roll or shaft to any desired position without interference from the main drive mechanism.

While I have herein described and upon the drawings shown illustrative embodiments of the invention, it is to be understood that the invention is not limited thereto, but may comprehend other constructions, arrangements of parts, details and features, without departing from the spirit of the invention.

I claim:

1. In a spring clutch for connecting a rotatable driven member to a rotating driving member, a clutch spring fastened to said driving member and encircling said driven member, a collar fastened to said spring, a friction ring slidable in a circular path on the periphery of said collar, and means for holding said friction ring against rotation with said collar to momentairly retard rotation of said collar and tighten said spring around said driven member, said last named means constantly restraining said friction ring from rotating with said collar during the rotation of said driving member.

2. In a spring clutch for connecting a rotatable driven member to a rotating driving member, a clutch spring fastened to said driving member and loosely encircling said driven member, a collar fastened to said clutch spring, an annular recess in the periphery of said collar, a friction ring slidable in said recess and rotatable with said collar, and means for restraining rotation of said friction ring to momentarily retard rotation of said collar with said driving member and tighten said spring around said driven member.

3. In a spring clutch for connecting a rotatable driven member to a rotating driving member, a clutch spring attached to said driving member and loosely encircling said driven member, a collar affixed to said spring, friction means pressed against and rotatable with said collar, and reaction means engageable with said friction means for terminating rotation of said friction means to vary the angular relationship between said driving member and said collar to tighten said spring around said driven member.

4. In a spring clutch for connecting a rotatable driven member to a rotating driving member, a clutch spring fastened to said driving member and encircling said driven member, a collar fastened to said clutch spring, an annular groove in the periphery of said collar, a friction ring slidably mounted in said groove and rotatable with said collar, a second spring resiliently urging said friction ring into said groove, and means for restraining rotation of said friction ring with said collar to cause said driving member to rotate relative to said collar and tighten said clutch spring around said driven member.

5. In a spring clutch for connecting a rotatable driven member to a rotating driving member, a clutch spring fastened to said driving member and loosely encircling said driven member, a collar fastened to said clutch spring, a split friction ring slidable on and rotatable with said collar, a second spring encircling the periphery of said friction ring, lug means on said friction ring, and means for engaging said lug means for restraining rotation of said friction ring with said collar to vary the angular relationship of said collar with respect to said driving member and tighten said clutch spring around said driven member.

6. In a spring clutch, a rotatable driven member, a rotating driving element, a spring fastened to one end of said rotating driving element and encircling a portion of said rotatable driven member, a collar fastened to the other end of said spring, friction means embracing and rotatable with said collar for varying the angular relationship between said driving member and said collar, said friction means including an outwardly projecting lug member, and selective means including a member engageable with said lug member for causing said friction means at the will of the operator to vary said collar in angular relationship with respect to the rotating driving element and tighten said spring on said rotatable driven element.

7. In a spring clutch, a rotatable driven member, a rotating driving element, a spring fastened to one end of said rotating driving element and encircling a portion of said rotatable driven member, a collar fastened to the other end of said spring, friction means including an outwardly projecting lug member rotatable with said collar, said collar being rotatable within said friction means upon arrestment of rotation of said friction means, and means engageable with said lug member for arresting the rotation of said friction means with respect to said collar to vary the angular relationship between said rotating driving element and said collar and cause said spring to tighten around said rotatable driven member.

8. In a spring clutch having revoluble driving and driven members, a clutch spring connected to said driving member and having coil turns loosely encircling said driven member, a collar attached to at least one of said coil turns, a friction ring embracing and rotatable with said collar, said collar being slidable within said friction ring upon arrestment of rotation of said friction ring, and means for arresting rotation of said friction ring relative to said driving member to momentarily retard rotation of said collar relative to said driving member to cause said coil turns to tighten around said driven member and create a driving connection between said driving and driven members.

9. In a spring clutch having revoluble driving and driven members, a clutch spring connected to said driving member and having coil turns loosely encircling said driven member, a collar attached to one of said coil turns, an annular recess in said collar, a split friction ring received in said recess, spring means resiliently urging said friction ring into said annular recess for rotation with said collar, said collar being slidable in a circular path within said friction ring upon arrestment of rotation of said friction ring, and means for arresting rotation of said friction ring relative to said driving member to momentarily vary the angular velocity of said collar relative to that of said driving member to cause said coil turns to tighten around said driven member and create a driving connection between said driving and driven members.

10. In a spring clutch including a revoluble drive spring and a driven member encircled by said drive spring, a collar connected to said drive spring and mounted in a coaxial relationship to said driven element, an annular recess in said collar, contractible friction means positioned in said recess for rotation with said collar, and means engageable with said friction means for decreasing the angular velocity of said friction means relative to that of said drive spring to cause said collar to drag within said friction means and tighten said spring around said driven element.

11. In a spring clutch including a revoluble coiled drive spring and a driven member encircled by said drive spring, a collar fastened to said drive spring and mounted on the periphery of said driven element, an annular recess in said collar, a contractible slotted friction element positioned in said recess, a garter spring encircling said friction element and urging said friction element into said recess for rotation with said collar, and means engageable with said friction element for decreasing angular velocity of said friction element to cause said collar to drag within said friction element and vary the angular relationship between the coils of said spring to tighten said spring around said driven element.

12. In a spring clutch including a revoluble coiled drive spring and a driven member encircled by said drive spring, a collar fastened to said drive spring and mounted on said driven member, an annular recess in said collar, a contractible slotted friction element positioned in said recess, a garter spring encircling said friction element and urging said friction element into said recess for rotation with said collar, lug means projecting from said friction element, and means engageable with said lug means for terminating rotation of said friction element for causing said collar to drag within said friction element and vary the angular relationship between said collar and the coils of said drive spring to tighten said drive spring around said driven element.

13. In combination: a frame member, a rotatable driven member supported on said frame member, a rotating driving member supported on said frame member, a clutch spring fastened to said driving member and encircling said driven member for connecting said driven member to said driving member, a rotatable collar fastened to said spring, friction means urged against said collar, and stationary means connected to said frame member holding said friction means against rotation with said collar to retard rotation of said collar and tighten said spring around said driven member, said stationary means constantly restraining said friction means from rotating with said collar during the connection of said driven and driving members.

References Cited in the file of this patent

UNITED STATES PATENTS

| | | |
|---|---|---|
| 264,785 | Sterling | Sept. 19, 1882 |
| 1,861,584 | Readeker et al. | June 7, 1932 |
| 1,904,181 | Wagner | Apr. 18, 1933 |
| 2,227,701 | Bush | Jan. 7, 1941 |
| 2,284,767 | Racklyeft | June 2, 1942 |
| 2,551,739 | Harlan | May 8, 1951 |
| 2,685,949 | Dunlap | Aug. 10, 1954 |

FOREIGN PATENTS

| | | |
|---|---|---|
| 120,474 | Great Britain | 1918 |

UNITED STATES PATENT OFFICE

CERTIFICATE OF CORRECTION

Patent No. 2,915,158                                          December 1, 1959

Thomas R. Smith

It is hereby certified that error appears in the printed specification of the above numbered patent requiring correction and that the said Letters Patent should read as corrected below.

Column 5, line 5, for "function" read -- friction --.

Signed and sealed this 17th day of May 1960.

(SEAL)
Attest:

KARL H. AXLINE
Attesting Officer

ROBERT C. WATSON
Commissioner of Patents